United States Patent [19]

Payne

[11] Patent Number: 4,523,100

[45] Date of Patent: Jun. 11, 1985

[54] OPTICAL VERNIER POSITIONING FOR ROBOT ARM

[75] Inventor: Fred A. Payne, Marina del Rey, Calif.

[73] Assignee: R & D Associates, Marina del Rey, Calif.

[21] Appl. No.: 407,164

[22] Filed: Aug. 11, 1982

[51] Int. Cl.³ ............................................. G01N 21/86
[52] U.S. Cl. ..................................... 250/561; 901/41; 901/47
[58] Field of Search .................. 901/41, 46, 47, 9; 414/720, 620; 408/13; 250/203 R, 561; 356/1

[56] References Cited

U.S. PATENT DOCUMENTS

| | | | |
|---|---|---|---|
| 3,888,362 | 6/1975 | Fletcher et al. | 414/620 |
| 4,170,891 | 10/1979 | Elsner | 901/46 |
| 4,273,482 | 6/1981 | Lloyd et al. | 901/9 |
| 4,286,417 | 9/1981 | Shelton | 901/41 |
| 4,407,614 | 10/1983 | Muhr et al. | 408/13 |
| 4,453,085 | 6/1984 | Pryor | 250/203 R |

Primary Examiner—David C. Nelms
Assistant Examiner—J. Jon Brophy
Attorney, Agent, or Firm—Poms, Smith, Lande & Rose

[57] ABSTRACT

An improvement to computer control robot arm assemblies having a work head on the free end thereof for allowing the work head to be positioned and held within closer tolerance limits to a desired coordinate position. The work head is attached to the robot arm by a vernier control assembly allowing vernier movement in the X, Y, and Z directions. A moveable support member is provided on the robot arm adjacent the work head. A detector is mounted to the work head for sensing a light beam. A collimated light beam is passed through a point associated with the desired coordinate position under computer control. The work head is positioned within first tolerance limits by the robot arm under computer control. The logic of the computer then contacts the work piece with the support member to hold the free end of the robot arm in position. Under closed-loop computer control, the vernier drives are used to position the detector at a point where the work piece is in the desired coordinate position.

9 Claims, 16 Drawing Figures

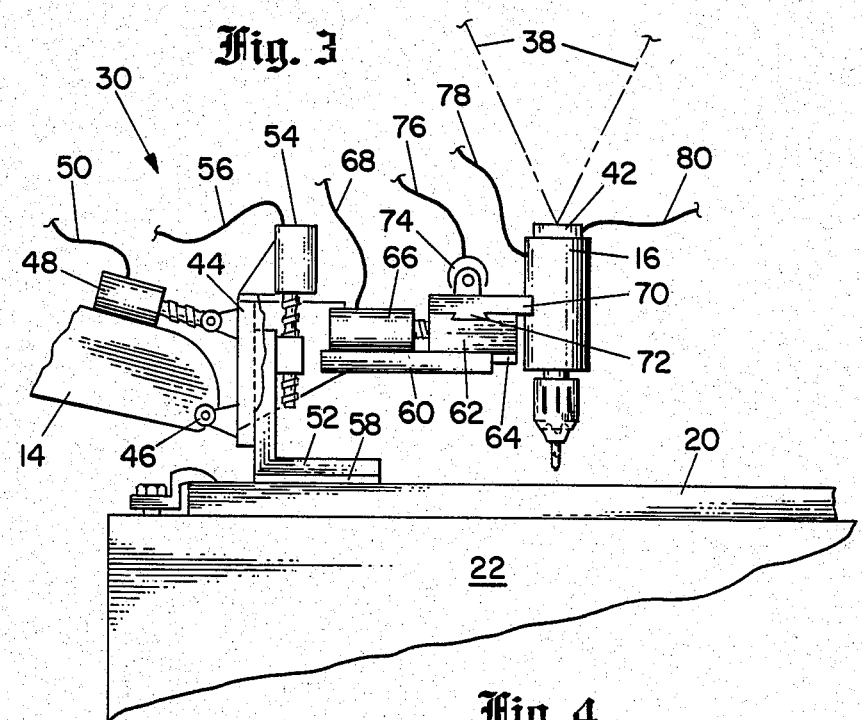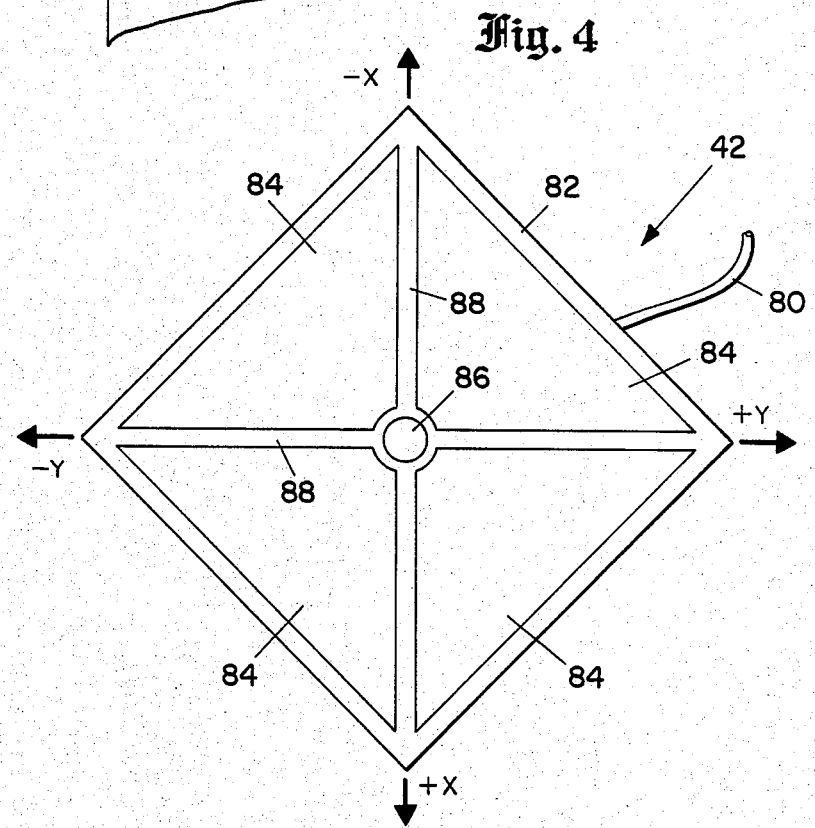

OPTICAL VERNIER POSITIONING FOR ROBOT ARM

FIELD OF THE INVENTION

This invention relates to precision robot arm systems.

BACKGROUND OF THE INVENTION

The present invention relates to computer controlled robot arms and, more particularly, control systems for positioning and holding work heads carried by robot arms at selected coordinate positions for performing desired operations within close tolerance limits.

Computer controlled robot arm assemblies are becoming more widely used in a variety of assembly line operations. In uses such as the drilling or spot welding of automobiles, precision is not important. Thus, the tolerance limits capable because of the play in the various joints of the robot arm are not critical.

As reported in the Mar. 1, 1982 edition of Aviation Week and Space Technology in an article beginning at page 69 entitled "USAF Seeks Increased Robot Precision," present robot arm assemblies are not capable of maintaining the accuracy required in the fabrication of aircraft parts. For example, as stated therein, an overlay template with tapered lock-on bushings is required to achieve needed positioning accuracy for drilling of the acrylic windshields on the McDonnell-Douglas F-15 Aircraft. The fabrication of such templates prior to production runs is, of course, time consuming and expensive. Any changes to the specification requires a remake or modification of the template. Another problem is the type of materials being used in the more exotic high-speed aircraft. As reported in the aforementioned article, lack of rigidity at the end of a robot's arm can cause problems in the shape of holes drilled by robots in certain types of material such as graphite epoxy composites. If a robot's hand effector or work head fails to hold a drill steadily perpendicular to the materials surface, the hole may become cloverleafed or egg-shaped. The specifications for holes required in aerospace manufacturing include class 2, which must be no smaller than the nominal size and a circumference with bulges no larger than 0.003 inches and class 3 holes which must be within 0.006 inches. What is desired is a robot arm assembly with tool-placement accuracy of 0.005 inches.

The problem can be visualized in the simplified drawing of a prior art robot arm assembly shown in FIG. 1. The assembly, generally indicated as 10, comprises a base 12 having a number of powered, articulated arms 14 extending therefrom and terminating in an effector or work head 16 at the free end thereof. A computer 18 is connected to move the arms 14 to position the work head 16 at various locations. For example, as shown, a work piece 20 can be positioned on a work table 22 and a drill bit 24 driven by the work head 16 moved about the work piece 20 to drill the required holes therein at preselected locations. As can be seen, however, a certain amount of vertical play as indicated by the angle "A" occurs at the first joint labelled 26. A certain amount of horizontal play as indicated by the angle "B" also occurs at the first joint 26. At the second joint, indicated as 28, there is additional vertical play as indicated by the angle "C" and horizontal play as indicated by the angle "D". At the work head 16, the play in the joints 26, 28 translates into tolerance errors in the X, Y and Z directions. If the coordinate directions are taken as indicated in FIG. 1, it can be seen that the horizontal combination of play of angles B and 2 translates into a X coordinate tolerance limit of L(B+D). In like manner, the Y tolerance limit is M(A+C) and the Z direction (which in this case effects the depth of the hole drilled) has a tolerance of K(A+C).

While the play movements at the joints 26, 28 is, admittedly, small, the accumulation of tolerances is such as to prevent the robot arm assembly 10 according to the prior art from achieving the necessary tolerance limits discussed above, particularly when the robot arms are relatively long or flexible. Wherefore, it is the object of the present invention to provide a robot arm assembly capable of independently achieving high tolerance in position achievement and maintenance without the necessity for overlay templates and the like.

SUMMARY OF THE INVENTION

The foregoing objective has been met in a computer controlled robot arm assembly having a work head on the free end thereof and being able to position and hold the work head adjacent a work piece at coordinates within first tolerance limits by the improvement of the present invention for locating a work head to much higher second tolerance limits, comprising: means operably driven by the computer for creating a first collimated light beam through points associated with the desired coordinates; detector means carried by the work head and operably connected to the computer for detecting the light beam and sending a signal reflecting the position of the light beam on the detector means to the computer, the detector means having a central position thereon when the light beam is passing through the work head is at the desired coordinates within the second tolerance limits; a moveable support member carried by the arm adjacent the work head for contacting the work piece and supporting the work head; vernier drive means operably connected to be driven by the computer and positioned between the end of the robot arm and the work head for moving the work head in the X, and Y directions when the robot arm is supported by the support member; and, logic means contained within the computer for, directing the light beam through a point associated with a desired coordinate for the work head, moving the work head to the coordinate whereby the light beam is positioned within the sensing limits of the detector means, moving the support member to contact the work piece and support the work head a preset distance from the work piece, and, operating the vernier drive means in closed loop relationship with the detector means to position work head with the light beam through the central position thereof whereby the work head is placed at the desired coordinate within the second tolerance limits.

In the preferred embodiment, means are additionally provided to be driven by the computer for creating a second collimated light beam through points associated with the desired coordinates and intersecting the first light beam at an angle. Additionally, the logic means is adapted to position in the central position of the detector means at the intersection of the light beams whereby the light beams can determine the X, Y, and Z coordinates of the work head position, thus allowing accomodation to workpiece shape irregularity.

From a broad aspect of the invention, the extreme outer end of the robot arm may initially be positioned within certain coarse tolerances; and subsequently a collimated light beam may be employed in combination with localized vernier positioning arrangements to locate the "effector" or the work head relative to the outer end of the robot arm.

Other objects, features and advantages of the invention will become apparent from a consideration of the following detailed description and from the accompanying drawings.

DESCRIPTION OF THE DRAWINGS

FIG. 3 is an enlarged schematic view of the work head portion of the robot arm assembly of the present invention at its free end.

FIG. 4 is a plan view of one type of detector which may be utilized to achieve the objectives of the present invention.

DESCRIPTION OF THE PREFERRED EMBODIMENT

Figure 1:
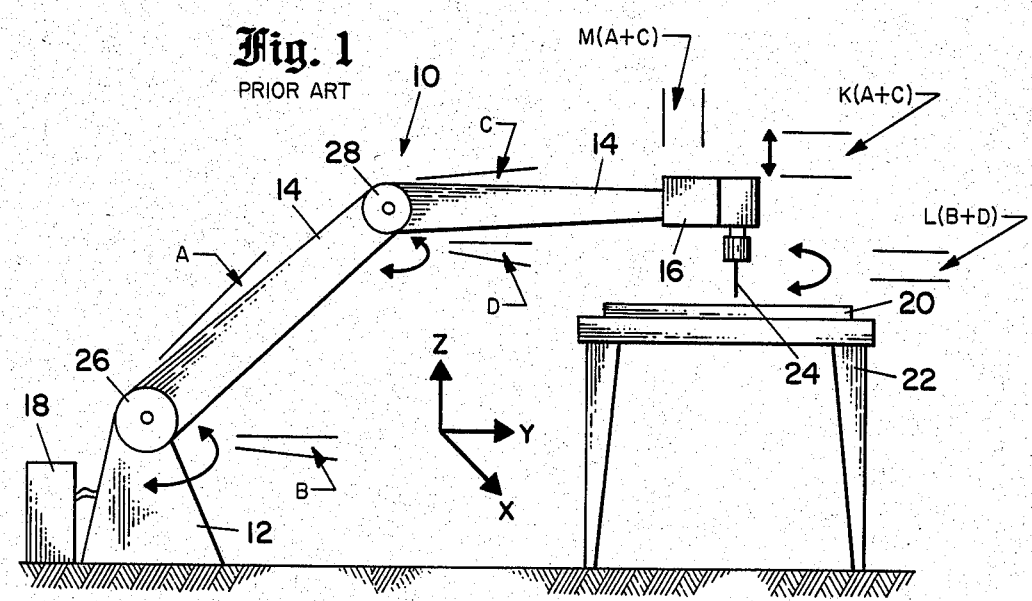
FIG. 1 is a simplified elevation view of a prior art robot arm assembly.
Figure 2:
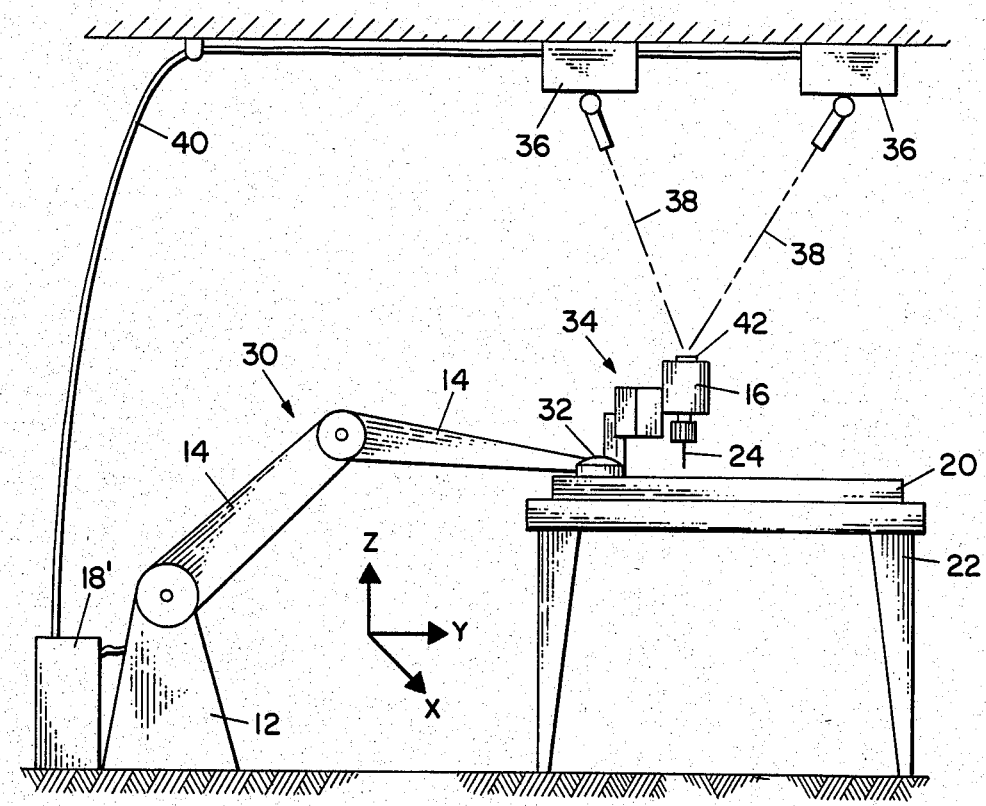
FIG. 2 is a simplified elevation view of a robot arm assembly according to the present invention.

Referring first to FIG. 2, the robot arm assembly 30 of the present invention is shown. As with the prior art assembly 10 of FIG. 1, robot arm assembly 30 comprises a base 12 having a pair of arms 14 extending therefrom being powered and positionable by a computer 18'. At the free end, however, a support member 32 is provided for contacting the work piece 20 to support the free end of the robot arm assembly 30 and prevent undesired motion thereof. A vernier drive assembly 34 is positioned between the end of the arm 14 at the free end of the assembly 30 and the work head 16. The vernier drive assembly 34 will be discussed in greater detail shortly hereinafter.

For convenience in discussion, the coordinate directions are chosen to be identical to those of FIG. 2. That is, the Y-axis is along the line of forward and backward motion of the arm 14, the X-axis is horizontally perpendicular thereto generally corresponding to sideways motion of the arms 14 about the base 12. The Z-axis is perpendicular to the top surface of the table (and substantially perpendicular to the surface of the work piece 20), which lies in the plane of the X and Y axis.

For positioning, the pair of moveable lasers 36 are mounted above the work head 16 along the Y-axis. Such specific positioning of the laserpiece 36 is not necessary to achieve the objectives of the present invention but happens to work particularly well for the particular embodiment being described herein. The lasers 36 produce colimated light beams 38. The lasers 36 are connected to the computer 18' by cable 40 to be controlled by the computer 18'. A photodetector 42 is positioned atop the work head 16 to detect the light beams 38 and provide a signal to the computer 18' whereby a closed loop control system can be effected in the manner to be described hereinafter.

Turning now to FIG. 3, the portions of the robot arm assembly 30 by which the major points of novelty of the present invention are implemented, are shown in greater detail. The free end of the last arm 14 is fitted with a generally U-shaped yoke 44 which is mounted to arm 14 for pivoting motion around horizontal pivot pin 46. A motor operated vernier drive 48 is operably connected between the arm 14 and the yoke 44. Cable 50 operably connects it to the computer 18' for driving thereby. A support member 52 is operably carried by the yoke 44 for sliding motion relative thereto. A motor driven vernier drive 54 is operably connected between the yoke 44 and the support member 52. Vernier drive 54 is connected by cable 56 to the computer 18' to be driven thereby. Support member 52 is provided on the bottom surface thereof with a non-slip material 58 to hold the support member 52 on the work piece and against relative motion with respect thereto. Alternatively, non-slip material 58 could be replaced by an electromagnet or vacuum gripping head under the control of computer 18' to effect a more positive non-slip relationship to the work piece 20. As can be seen, by use of the vernier drive 48 the yoke 44 can be positioned such that operation of the vernier drive 54 will raise or lower the work head 16 along the Z-axis. It should be noted at this time that the objectives of the present invention can be realized for operation in only the X and Y direction (i.e. two dimensional control by the use of a single laser 36 and the positioning of the work head 16 at a fixed pre-set distance from the surface of the work piece 20 by use of the vernier drive 48, 54). As being described herein, however, full 3-axis (i.e., X, Y, and Z) control is being effected even though the work piece shown is flat.

A flat mounting plate 60 is carried by the yoke 44 parallel to the support member 52. Thus, when support member 52 is positioned in the horizontal X-Y plane, plate 60 is also horizontal and parallel thereto. A first slider block 62 is mounted to the mounting plate 60 as with key-way 64 for sliding motion along the longitudinal axis of the arm 14 (i.e. generally corresponding to the Y-axis). A motor driven vernier drive 66 is operably connected between the mounting plate 60 and the first slider block 62. Vernier drive 66 is operably connected to the computer 18' by cables 68 to be driven thereby. A second slider block 70 is operably mounted to first slider block 62 as with keyway 72 for sliding motion in the horizontal plane perpendicular to the axis of motion of first slider block 62 (i.e. generally in the X-axis). A motor driven vernier drive 74 is operably connected between the first slider block 62 and second slider block 70. Vernier drive 74 is connected by cable 76 to the computer 18' to be driven thereby. The work head or effector 16 is mounted vertically to second slider block 70. Cable 78 connects the work head 16 to the computer 18'. The detector 42 is mounted to the top of the work head 16 and has cable 80 therefrom connected to the computer 18' whereby a signal is sent from the detector 42 to the computer 18' reflecting the position of the light beam 38 incident upon the detector 42.

Turning now to FIG. 4, detector 42 according to one embodiment is shown in simplified form. As will be understood by those skilled in the art, detector 42 can take many forms well known to those skilled in the art. For example, one such detector used for positioning robot arm is shown in the patent to Fletcher et al. U.S. Pat. No. (3,888,362) entitled "Cooperative Multiaxis Sensor for Teleoperation of Article Manipulating Apparatus." The Detector described hereinafter is included in simplified form for completeness in describing the mode of operation of the robot arm assembly 30 of the present invention and, in and of itself, forms no part of the present invention.

As shown in FIG. 4, detector 42 comprises a substrate 82 having generally triangular photo detector areas 84 thereon and with a central photo detector area 86. The areas 84 are spaced from one another to provide axes 88 therebetween. One axis 88 is aligned with the axis of movement of first slider box 62 and, therefore, generally is indicated as the −Y+Y axis while the other axis 88 is aligned with the sliding axis of second slider block 70 and is, therefore, indicated as the −X+X axis. In operation, the two laser beams 38 are sent by the computer 18' to intersect at a point related to a first desired coordinate such that when their intersection is coincident upon the central area 86, the work head 16 will be at the desired coordinate position within the desired narrower tolerance limits. The desired operation at that point can then be effected by the work head 16 by appropriate command along cable 78 from the computer 18'. The procedure is then repeated with a second coordinate point, and so forth.

Turning now to FIG. 3 in combination with FIGS. 5 et seq., the operation of the robot arm assembly of the present invention will be described in greater detail.

It will be recalled that the present invention is primarily directed to improving the tolerance achieving and holding capability of a robot arm assembly. It is therefore assumed that the basic positioning mechanism of the robot arm assembly 30 comprising the base 12 and arms 14 is such as to be able to position the work head 60 within reasonably close tolerances of any desired coordinate position. That being the case, when the mounting plate 60 is placed in a horizontal position by vernier drive 48 and the two slider blocks 62, 70 are placed in a neutral position by their respective vernier drives 66, 74, the two light beams 38 previously positioned by the computer 18' at a point related to selected coordinates, the beams 38 will fall within the detector areas 84 of the detectors 42. As previously discussed, the support member 52 is then placed in contact with the work piece 20 to support the free end of the robot assembly 30. Thereafter, the work head 16 can be raised or lowered in the Z-axis within the brief range of the vernier control which needs to be effected by the vernier drive 54. Likewise, the work head 16 can be shifted forward or backward or from side to side by the activization of vernier drive 66 and/or 74 as required. Two possible methods for achieving this final positional orientation with respect to a three axis system employing two light beams 38 are shown in FIGS. 5-16. Incidentally, in FIGS 5 through 16, the showings of the detector are the same as in FIG. 4, so all of the reference numerals are not repeated in connection with each figure of the drawings.

Figure 5:
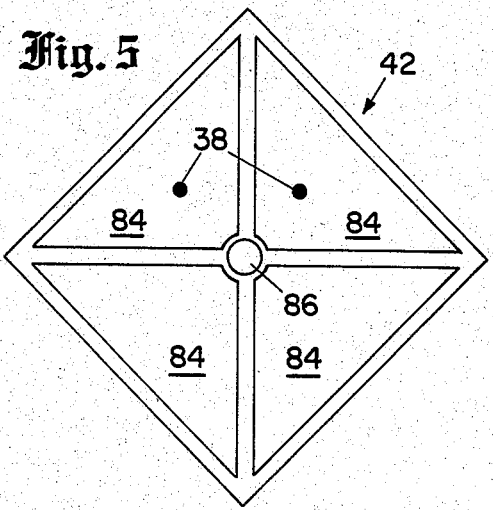
FIGS. 5, 6, 7, and 8 all show one method by which the detector of FIG. 4 may be used to position the work head of the present invention at its desired final position under closed loop control by the computer.
Figure 6:
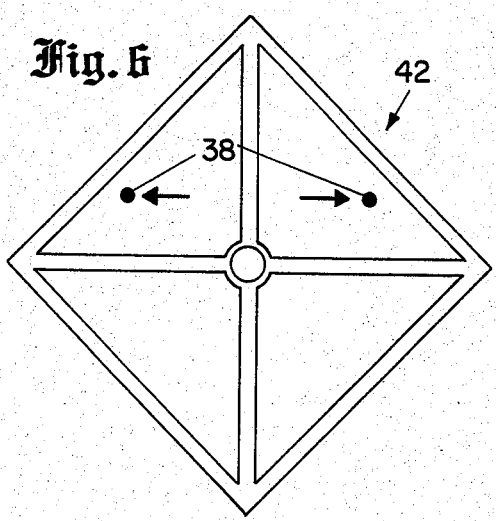
Figure 7:
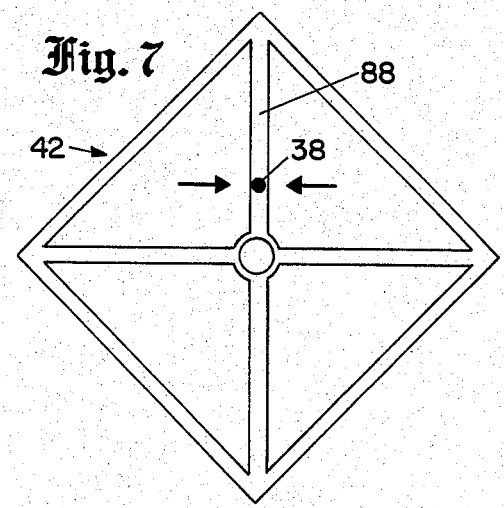
Figure 8:
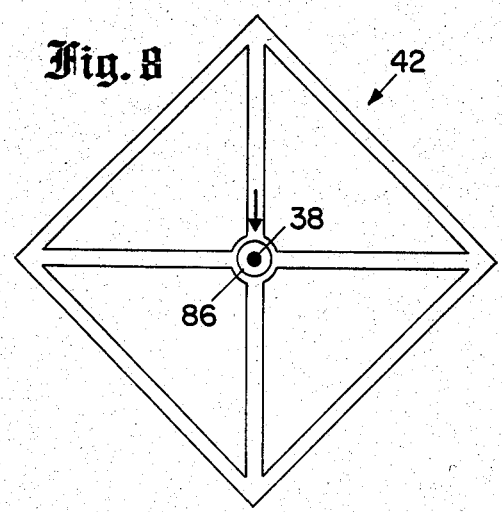
Figure 9:
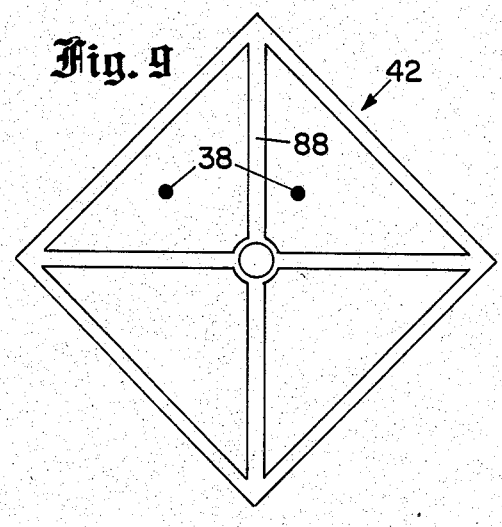
FIGS. 9, 10, 11, 12, 13, 14, 15 and 16 show an alternative method by which the detector may be used to position the work head of present invention under closed loop control by the computer.
Figure 10:
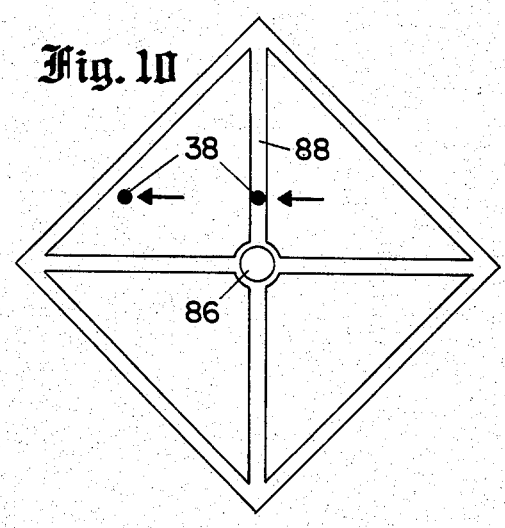

The first method is shown in FIGS. 5-8. In this method of positioning under closed loop control of the computer 18' as a result of the signals from detector 42 being fed back to the computer over cable 80, it is assumed that the detector areas 84 provide a weighted signal with respect to the proximity of an impinging light beam 38 on the area 84; that is, the signal upon the cable 80 being fed to the computer 18' and the logic therein accomplishing the feedback positioning of the work head 60 can tell the position of an impinging light beam 38 within a given area 84. In FIG. 5 it can be seen that the two beams 38 are striking two of the areas 84. If the vernier drive 54 is used to raise the mounting plate 60 a slight amount and the light beam impinging upon the areas 84 produce smaller values, it can be deduced that the coincident point is below the level of the detector 42. The first slider block 62 can be adjusted along the Y - axis until the values being produced by the two beams 38 are equal, thus indicating that the Y - axis orientation is proper for the coincident point but that the work head 16 needs to be lower and moved in the −X direction. As can be seen in FIG. 7, if the vernier drive 54 is then used to lower the work head 16, the two beams 38 can be placed in coincidence along the null axis 88. It is then merely a matter of using vernier drive 74 to move the second slider block 70 in the −X direction until coincidence of the beams 38 at the central area 86 is achieved. At that point, the work head 16 is positioned at the coordinate point within the narrow tolerance limits desired and, moreover, supported and held there by the support member 52.

Figure 11:
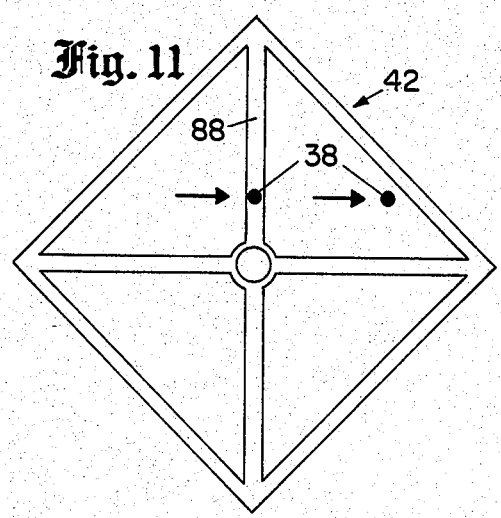
Figure 12:
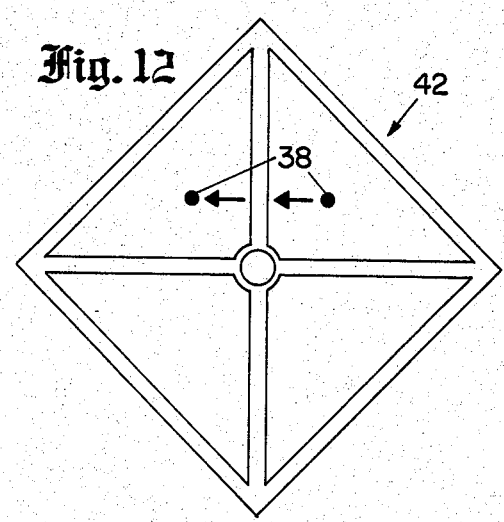
Figure 13:
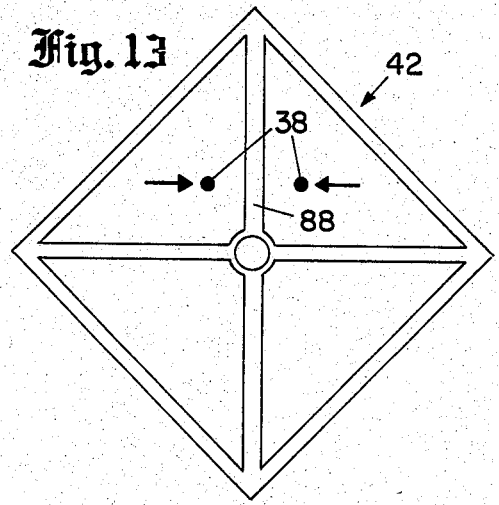
Figure 14:
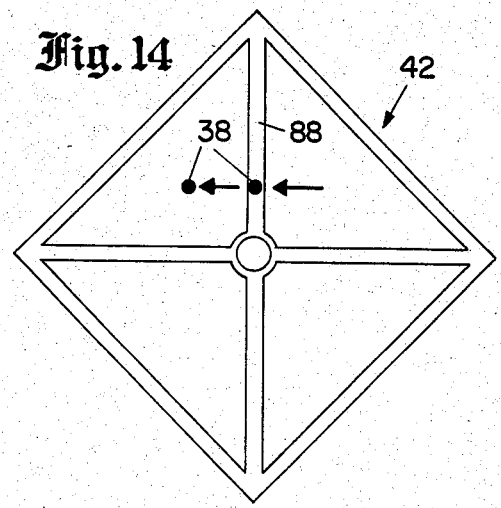
Figure 15:
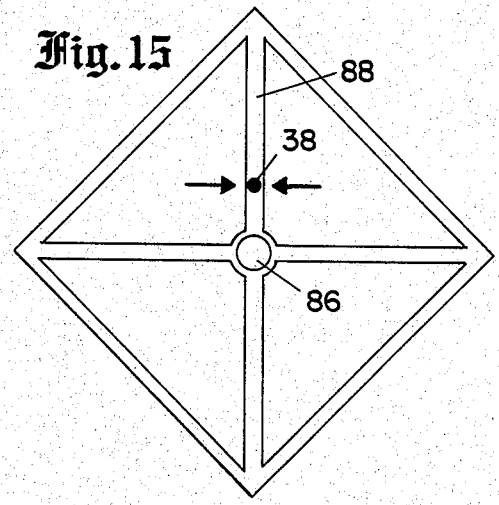
Figure 16:
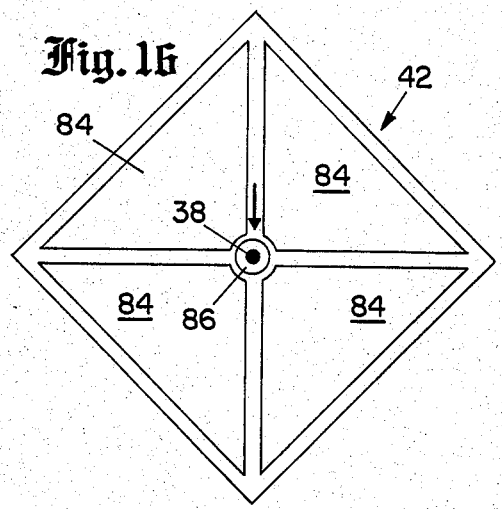

Positional coincidence can also be found employing a detector with only light impinging sensing capabilities (i.e. no weighting to the position of the light beam within the areas 86). Such a technique is a little more involved, but at computer speeds and within the slight areas of movement required, it is certainly a viable alternative. Such a technique is shown in FIGS. 9-16. Assume the positional orientation initially upon the work head 16 being positioned by the arm 14 within their tolerance limits at the coordinate point. By moving slider block 62 in the plus Y direction, the distance to one light beam can be measured as shown in FIG. 6. By then moving slider block 62 in the opposite or -Y direction, the distance between the light beams 38 can be calculated as shown in FIG. 11. Knowing the distance between the two light beams 38 and with one in coincidence with the null axis as shown in FIG. 11, the two beams can be placed in a straddling position over the axis 88 as shown in FIG. 12. The vernier 54 can once again be used to raise the mounting plate 60. Assume that in so doing, the positional orientation of the beams 38 shown in FIG. 13 is achieved. This of course is an indication that the detector 42 is below the point of coincidence of the beams 38. The distance to one of the light beams 38 point of coincidence on the area 38 can be recalculated by moving the first slider block 62 in the plus Y direction once again as shown in FIG. 14. This, of course, provides the computer 18' with the information that the beam 38 positions have moved together a known amount by the known amount of raising of the block 60 and detector 42 in combination. This information, of course, is sufficient to allow the computer 18' to shift the first slider block 62 in the plus Y direction and, simultaneously, to use vernier 54 to raise the mounting block 60 and detector 42 in combination so as to place the two beams into coincidence on the X null axis 88 as shown in FIG. 15. This, of course, corresponds to the previously achieved poaition of FIG. 7. Once the beams 38 have been placed in coincidence along the X null axis 88, it is a simple matter to shift the second slider block in the minus X direction to place the two beams 38 in coincidence at the central area 86 as shown in FIG. 16.

Once again, it should be noted that the detectors 42 described herein are merely illustrative of techniques which could be applied by those skilled in the art to affect the methods and purposes of the present invention. The present invention itself resides in the apparatus and technique of positioning a detector within first tolerance limits of a desired point, supporting the free end of the robot art assembly and thereafter by vernier drives in the X, Y, and Z directions under closed loop control between the computer, the vernier drives, and the detector 42, finally positioning the work head at the coordinate position desired within the more narrow tolerance limits and maintaining it by the support in contact with the work beams close adjacent thereto.

It is further noted that, in lieu of the use of the support member 32, the arms 14 may be made relatively massive, and could be provided with special clamping means at the joints thereof, so that, once the first coarse tolerance limits had been reached, these joint clamping mechanisms could be actuated. This action would serve to hold the extreme outer end of the robot substantially fixed in a manner similar to the support member 32. Thereafter, the fine or vernier adjustment of the work head position could be accomplished as described above. In addition, instead of being flat as shown, the work piece 20 may be curved or of other three dimensional configuration. Also, instead of a work head, the robot arm may carry a welding rod, a soldering iron or any other "effector" to be located remotely; and the vernier adjustments may be much smaller and more compact than the illustrative arrangements shown in the drawings. Further, wherein orthogonal coordinates, X and Y, or X, Y and Z are mentioned, it is to be understood that polar or cylindrical coordinates may be used or substituted. Accordingly, the present invention is not limited to that precisely as shown in the drawings and described in detail hereinabove.

What is claimed is:

1. In a computer controlled robot arm system having a work head on the free end thereof and being able to position and hold the work head adjacent the work piece at coordinates within the first tolerance, the improvements to position and hold the work head within second, closer, tolerance limits, comprising:
    (a) means operably driven by the computer for directing a first collimated light beam through points associated with the desired coordinates;
    (b) detector means carried by the work head and operably connected to the computer for detecting such light beam and sending a signal indicating the position of said light beam on said detector means to the computer, said detector means having a central position thereon where when said light beam is passing therethrough, the work head is at the desired coordinates within the second tolerance limits;
    (c) a movable support means carried by the arm adjacent the work head for contacting the work piece and supporting the work head;
    (d) vernier drive means operably connected to be driven by the computer and positioned between said support means and the work head for moving the work head in the X and Y directions when the robot arm is supported by said support means;
    (e) means for moving the work head toward said coordinates and for concurrently moving said support member to contact a work piece and support the work head, with said light beam positioned within the sensing limits of the detector means; and
    (f) means for energizing said vernier drive means in closed loop relationship with said detector means to place the work head with said light beam passing through said central position, whereby the work head is located at the desired coordinates within said second tolerance limits.

2. A robot arm system as defined in claim 1 including means for directing a second collimated light beam to intersect said first light beam at an angle thereto; and means for moving said work head relative to said support means to shift said work head detector to the intersection of the two light beams, to thereby locate said work head relative to X, Y and Z coordinates.

3. A robot arm assembly as defined in claim 1 including laser means for implementing said light beam.

4. A robot arm assembly as defined in claim 1 further comprising means for holding said support means in position on said work piece.

5. In a computer controlled robot arm system having an effector on the free end thereof and being able to position and hold the effector adjacent the work piece at coordinates within the first tolerance, the improvements to position and hold the effector within second, closer, tolerance limits, comprising:
    (a) means operably driven by the computer for directing a first collimated light beam through points associated with the desired locating coordinates;
    (b) detector means carried by the effector and operably connected to the computer for detecting such light beam and sending a signal indicating the position of said light beam on said detector means to the computer, said detector means having a central position thereon where when said light beam is passing therethrough, the effector is at the desired coordinates within the second tolerance limits;
    (c) means for holding the outer end of said robot arm substantially fixed relative to the workpiece;
    (d) vernier drive means operably connected to be driven by the computer and positioned between outer end of said robot arm and the effector for moving the effector in the X and Y directions relative to the end of the robot arm when it is substantially fixed in position by said holding means;
    (e) means for moving the effector toward said coordinates to a location where said light beam is positioned within the sensing limits of the detector means;
    (f) means for utilizing said holding means when said effector is located with its associated detector having said light beam within its sensing limits; and
    (g) means for energizing said vernier drive means in closed loop relationship with said detector means to place the effector with said light beam passing through said central position, whereby the effector is located at the desired coordinates within said second tolerance limits.

6. A robot arm system as defined in claim 5 including means for directing a second collimated light beam to intersect said first light beam at an angle thereto; and means for moving said effector relative to said support means to shift said work head detector to the intersection of the two light beams, to thereby locate said work head relative to X, Y and Z coordinates.

7. A robot arm system as defined in claim 5 including laser means for implementing said light beam.

8. A robot arm as defined in claim 5 wherein said holding means constitutes support means secured to the outer end of said robot arm for engaging the workpiece.

9. A robot arm system as defined in claim 8 further comprising means for holding said support means in position on said workpiece.

* * * * *